US010607058B2

(12) United States Patent
Wang et al.

(10) Patent No.: US 10,607,058 B2
(45) Date of Patent: Mar. 31, 2020

(54) DISPLAY PANEL AND DISPLAY DEVICE

(71) Applicant: Shanghai Tianma Micro-Electronics Co., Ltd., Shanghai (CN)

(72) Inventors: Lihua Wang, Shanghai (CN); Yang Zeng, Shanghai (CN); Lingxiao Du, Shanghai (CN); Qing Zhang, Shanghai (CN); Haochi Yu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 102 days.

(21) Appl. No.: 16/050,002

(22) Filed: Jul. 31, 2018

(65) Prior Publication Data

US 2019/0303637 A1 Oct. 3, 2019

(30) Foreign Application Priority Data

Mar. 29, 2018 (CN) .......................... 2018 1 0272931

(51) Int. Cl.
*G06K 9/00* (2006.01)
*G09G 3/3225* (2016.01)

(52) U.S. Cl.
CPC ......... *G06K 9/0004* (2013.01); *G09G 3/3225* (2013.01); *G09G 2300/0426* (2013.01); *G09G 2300/0809* (2013.01)

(58) Field of Classification Search
CPC ............... G06K 9/0004; G09G 3/3225; G09G 2300/0426; G09G 2300/0809
See application file for complete search history.

(56) References Cited

U.S. PATENT DOCUMENTS

| 2015/0262536 A1* | 9/2015 | Chen ..................... G09G 3/36 345/92 |
| 2017/0213065 A1* | 7/2017 | Kurasawa ............ G06K 9/0002 |
| 2017/0371213 A1* | 12/2017 | Wang ..................... G06F 3/044 |
| 2018/0197471 A1* | 7/2018 | Rotzoll ................ G09G 3/2007 |
| 2018/0357464 A1* | 12/2018 | Wang .................. G06K 9/0004 |
| 2019/0034686 A1* | 1/2019 | Ling ................... G06K 9/0004 |
| 2019/0042824 A1* | 2/2019 | Zheng ................. G06K 9/0004 |
| 2019/0157340 A1* | 5/2019 | Liao ....................... G09G 3/006 |
| 2019/0236325 A1* | 8/2019 | Zeng .................... G06K 9/0004 |
| 2019/0286878 A1* | 9/2019 | Liu ...................... G06K 9/0004 |

FOREIGN PATENT DOCUMENTS

CN 107133613 A 9/2017

OTHER PUBLICATIONS

Chinese Office Action for Chinese Priority Application No. 201810272931.5; Office Action dated Dec. 9, 2019.

\* cited by examiner

*Primary Examiner* — Utpal D Shah
(74) *Attorney, Agent, or Firm* — Miller, Matthias & Hull LLP

(57) ABSTRACT

Provided are a display panel and a display device. The display panel includes a display assembly and a fingerprint recognition assembly. The display assembly includes a base substrate, a plurality of pixel driving circuit units disposed on one side of the base substrate and at least two kinds of metal wires extending along a first direction, the plurality of pixel driving circuit units are arranged in a matrix along the first direction and a second direction, and a first gap region is formed between adjacent two of the plurality of pixel driving circuit units in the first direction. The display panel provided by the present disclosure provides the at least two kinds of metal wires to include a plurality of first type metal wires and a plurality of second type metal wires.

16 Claims, 13 Drawing Sheets

DISPLAY PANEL AND DISPLAY DEVICE

CROSS-REFERENCE TO RELATED APPLICATIONS

This application claims priority to a Chinese patent application No. 201810272931.5 filed on Mar. 29, 2018, the disclosure of which is incorporated herein by reference in its entirety.

TECHNICAL FIELD

The present disclosure relates to display technologies, and in particular relates to a display panel and a display device.

BACKGROUND

Everyone's dermatoglyph (including a fingerprint) is different from a pattern, a breakpoint and an intersection point, showing uniqueness and remaining unchanged throughout life. In view of the above contents, we can identify a person with his fingerprints to verify his real identity by comparing his fingerprints with a pre-stored fingerprint data, and that is the fingerprint recognition technology. With the development of electronic integrated manufacturing technology, an optical fingerprint recognition technology in the fingerprint recognition technology has begun to enter in our daily life and becomes a technology, which is researched in-depth, most widely applied and developed to a maturity stage, in a biological detection.

At present, the optical fingerprint recognition technology is usually combined with display technology, so that a display panel not only has a normal display function, but also can carry out a fingerprint recognition. Therefore, functions of the display panel have been enriched and the security performance of the display panel is improved. In order to enable the display panel to have a fingerprint recognition function, an external fingerprint recognition unit is usually arranged in an existing display panel. The external fingerprint recognition unit is glued on a base substrate of the display panel by optical glues. The fingerprint recognition unit performs the fingerprint recognition by receiving light emitted from a touch object. However, the light transmittance performance of a display panel in a related art is relatively poor, causing a relatively weak strength of light signals received by the fingerprint recognition unit, and the strength of a fingerprint recognition signal is relatively weak.

SUMMARY

The present disclosure provides a display panel and a display device so as to improve the light transmittance of the display panel, thereby improving the strength of fingerprint recognition signals.

In a first aspect, the present disclosure provides a display panel, and the display panel includes:

a display assembly, the display assembly includes a base substrate, a plurality of pixel driving circuit units disposed on one side of the base substrate and at least two kinds of metal wires extending along a first direction, the plurality of pixel driving circuit units are arranged in a matrix along the first direction and a second direction, and a first gap region is formed between adjacent two of the plurality of pixel driving circuit units in the first direction;

a fingerprint recognition assembly disposed on one side of the base substrate facing away from the plurality of pixel driving circuit units, the fingerprint recognition assembly includes at least one fingerprint recognition unit, the at least one fingerprint recognition unit is configured to perform a fingerprint recognition based on light reflected from a touch object to the fingerprint recognition unit; and the at least two kinds of metal wires include a plurality of first type metal wires and a plurality of second type metal wires, the plurality of first type metal wires and the plurality of second type metal wires are disposed in different layers, a vertical projection of at least one of the plurality of first type metal wires on the base substrate is overlapped with vertical projections of the plurality of second type metal wires on the base substrate in the first gap region.

In a second aspect, the present disclosure provides a display device, and the display device includes a display panel provided in the first aspect.

The display panel provided by the present disclosure provides at least two kinds of metal wires to include a plurality of first type metal wires and a plurality of second type metal wires, the first type metal wire and the second type metal wires are disposed in different layers, a vertical projection of at least one of the first type metal wires on the base substrate is overlapped with vertical projections of the second type metal wires on the base substrate in the first gap region, the area of the base substrate obscured by the metal wires in the first region may be decreased, that is, the affection of the metal wires on a light transmittance of the display panel is decreased; therefore, more light reflected from the touch object are enabled to be received by the fingerprint recognition unit, so that the strength of signals received by the fingerprint recognition assembly is improved.

DETAILED DESCRIPTION

Figure 1:
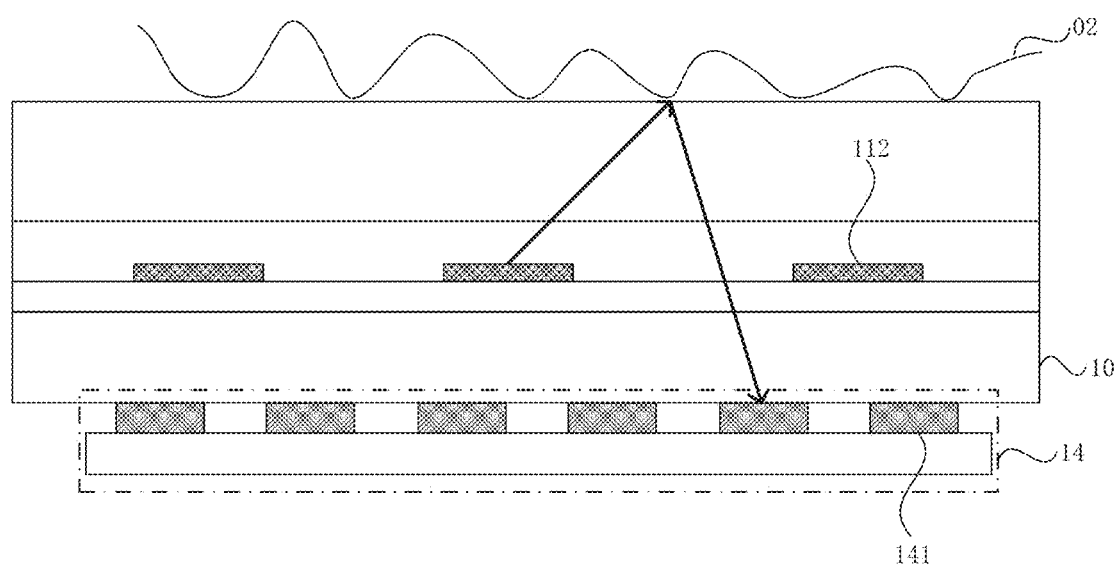
FIG. 1 is a structural diagram showing a display panel according to an embodiment of the present disclosure.

The present disclosure is further detailed below in combination with the drawings and embodiments. It should be understood that the specific embodiments described herein are merely used to explain the present disclosure rather than limiting the present disclosure. In addition, it should be stated that in order to facilitate the description, merely a part of structures related to the present disclosure rather than the whole structure are illustrated in the drawings.

A display panel provided by the present disclosure has a function of fingerprint recognition and may improve a light transmittance of a fingerprint recognition signal. In one embodiment, the display panel includes a display assembly and a fingerprint recognition assembly; the display assembly includes a base substrate, a plurality of pixel driving circuit units disposed on one side of the base substrate and at least two kinds of metal wires extending along a first direction, for example, the at least two kinds of metal wires may include a plurality of first type metal wires and a plurality of second type metal wires. The plurality of pixel driving circuit units are arranged in a matrix along the first direction and a second direction, and a first gap region is formed between adjacent two of the plurality of pixel driving circuit units in the first direction. In this embodiment, second type metal wires may only represent one kind of metal wires or may be a generic term for other kinds of metal wires which include the at least two kinds of metal wires except the first type metal wires.

Due to an existence of each function film layer (especially metal film layers) of the pixel driving circuit unit and relatively poor light transmittance performance of each function film, an area in which the each function film layer is disposed is commonly a non-transparent region. In this embodiment, the first gap region includes a transparent region and a non-transparent region formed by obscuration of the at least two kinds of metal wires.

It should be noted that, the light transmittance in the present disclosure is referred with respect to the fingerprint recognition assembly. That is, the light transmittance reflects the amount of light signals received by the fingerprint recognition assembly, the better the light transmittance, the more the light signals received by the fingerprint recognition assembly.

In the present disclosure, the plurality of first type metal wires and the plurality of second type metal wires are disposed in different layers, and a vertical projection of at least one of the plurality of first type metal wires on the base substrate is overlapped with vertical projections of the plurality of second type metal wires on the base substrate in the first gap region. Commonly, pixel driving circuit units are parallelly arranged with a uniform spacing. As the density of the pixel driving circuit units improves, an occupied area of each of the pixel driving circuit units becomes smaller and smaller. In particular, a pixel driving circuit unit including a plurality of transistors has an extremely small transparent region in its involved area, and considering that the at least two kinds of metal wires are restricted by positions of transistors, if the light transmittance is improved by adjusting a part of the at least two kinds of metal wires disposed in the pixel driving circuit units, a layout of metal wires for this part is very complex. For example, each of the metal wires may be bent back and forth, which causes the resistances of the metal wires to be increased and the transmission quality of signals is affected. However, in the first gap region, the transparent region is relatively large and a layout of the at least two kinds of metal wires is not affected by the pixel driving circuit units in the first gap region. Therefore, the present disclosure may reduce the area covered by the metal wires by providing the vertical projections of the at least two kinds of metal wires to be overlapped, so that the area of the transparent region is increased and the light transmittance is improved.

In one embodiment, a non-transparent region is an area in the first gap region obscured by the first type metal wires and the second type metal wires, and a transparent region is an area in the first gap region not covered by the first type metal wires and the second type metal wires. As an area ratio of the transparent region to the non-transparent region increases, that is, the area of the transparent region is increased and the area of the non-transparent region is decreased, a proportion of light passing through is increased. That is, the light transmittance of the display panel is improved. The present disclosure provides vertical projections of at least one of the first type metal wires and the second type metal wires on the base substrate to be overlapped. In contrast with a related art where vertical projections of each of the first type metal wires and the second type metal wires on the base substrate are not overlapped, in the present application, with the area involved at least one of the first type metal wires or the second type metal wires is converted from a non-transparent region into a transparent region. That is, the affection of metal wires on the light transmittance of the display panel by the metal wires is reduced, so that the light transmittance of the display panel is improved.

In one embodiment, in an area in which the first gap region is not included or the pixel driving circuit units disposed, vertical projections of the first type metal wires and the second type metal wires on the base substrate are not overlapped.

In addition, in the first gap region, vertical projections of all of the first type metal wires and the second type metal wires on the base substrate are overlapped. In such way, the affection on the light transmittance of the display panel by all of the first type metal wires may be reduced, the light transmittance of the display panel is further improved, so that the strength of signals received by the fingerprint recognition unit is further improved.

In combination with a principle of fingerprint recognition, a description for how to improve the light transmittance of display panel is given as follows.

FIG. 1 is a structural diagram showing a display panel according to an embodiment of the present disclosure. Referring to FIG. 1, a fingerprint recognition assembly 14 is disposed on one side of the base substrate facing away from pixel driving circuit units 11 (not shown in FIG. 1 and a pixel unit 112 includes a pixel driving circuit unit 11 and a light-emitting unit), the fingerprint recognition assembly 14 includes at least one fingerprint recognition unit 141, the fingerprint recognition unit 141 is provided to perform a fingerprint recognition based on light reflected to the fingerprint recognition unit 141 via a touch object 02.

In one embodiment, an optical fingerprint recognition method is adopted in the fingerprint recognition unit 141, light reflected from different positions of a fingerprint of the touch object 02 enters into the fingerprint recognition unit 141, the light reflected by the fingerprint is received by the fingerprint recognition unit 141 so as to generate electrical signals related to features of the fingerprint. A concave-convex changed texture (a valley and a ridge) exists in the fingerprint, since a refractive index of a finger is almost the same as that of the display panel, when light emitted from a light source of the fingerprint recognition unit 141 arrives at a surface where the ridge of the fingerprint contacts with the display panel, the light directly enters into the finger, and when light emitted from a light source of the fingerprint recognition unit 141 arrives at a surface where the valley of the fingerprint contacts with the display panel, the light is reflected or even totally reflected. The light arriving at the valley of the fingerprint may be detected by the fingerprint recognition unit 141, so that the features of the touch object 02 can be reflected by whether or not there are feedback electrical signals in the fingerprint recognition unit 141. Therefore, a function of fingerprint recognition of the display panel is achieved.

In one embodiment, an electrical signal fed back by the fingerprint recognition unit 141 may be a current signal or a voltage signal.

In one embodiment, the display panel further includes a light source of the fingerprint recognition unit. Reflected light formed by reflecting light emitted from the light source via the touch object enters into the fingerprint recognition unit so as to perform the fingerprint recognition. In practical configuration, the pixel unit may be utilized as a light source, or an external-type fingerprint recognition light source is arranged in the display panel.

Exemplarily, still referring to FIG. 1, the pixel unit 112 provides a light source for the fingerprint recognition assembly 14, the fingerprint recognition unit 141 is configured to perform a fingerprint recognition according to light emitted from the pixel unit 112 reflecting to the fingerprint recognition unit 141 via the touch object 02.

In one embodiment, the pixel unit 112 includes a pixel driving circuit unit and a light-emitting unit (not shown in FIG. 1), and the light-emitting unit is configured to emit light under control of the pixel driving circuit unit. In such way, the pixel unit is reused as a light source of fingerprint recognition, so that an extra light source is not required to be configured, thereby simplifying structures of the display panel and both of the manufacturing cost and manufacturing difficulty of the display panel being decreased.

In one embodiment, the light-emitting unit is disposed on one side of the pixel driving circuit unit, the first type metal wires and the second type metal wires facing away from the base substrate, and light emitted from the light-emitting unit directly arrives at the touch object without passing through the pixel driving circuit unit and metal wires. That is, during a propagation process of light transmitting from the light-emitting unit to the touch object, an existence of the metal wires does not affect the light transmittance. Light reflected from the touch object arrives at a film layer in which the metal wires disposed, during this process, since vertical projections of at least one of the first type metal wires and the second type metal wires on the base substrate are provided to be overlapped, the area of the display panel obscured by the metal wires may be decreased, so that the affection of the metal wires on the light transmittance of reflection light is reduced. That is, the light transmittance of the reflection light is enabled to increase, the strength of the light received by the fingerprint recognition unit is increased, so that the strength of signals received by the fingerprint recognition unit is improved.

Figure 2:
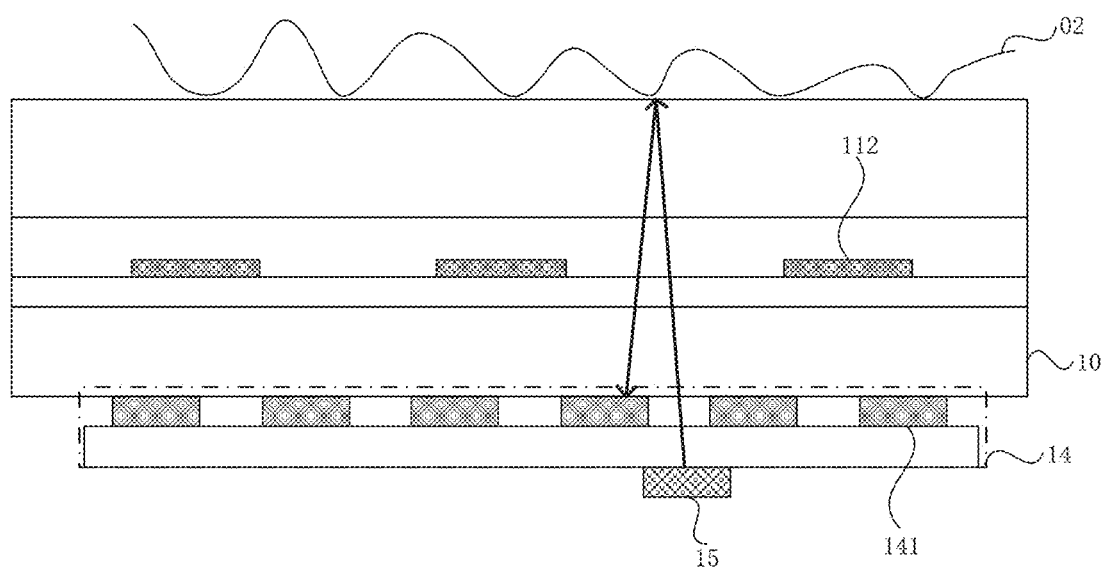
FIG. 2 is a structural diagram showing another display panel according to an embodiment of the present disclosure.

In addition, exemplarily, FIG. 2 is a cross-section view showing structures of a display panel according to an embodiment of the present disclosure, and structures of a display panel with an external type fingerprint recognition light source is shown in FIG. 2. Referring to FIG. 2, a fingerprint recognition light source 15 is disposed on one side of the fingerprint recognition assembly 14 facing away from the base substrate 10; light emitted from the fingerprint recognition light source 15 irradiate to the touch object 02 via a gap between adjacent two fingerprint recognition units 141, and the fingerprint recognition unit 141 is provided to perform a fingerprint recognition according to light emitted from the fingerprint recognition light source 15 reflecting to the fingerprint recognition unit 141 via the touch object 02.

In one embodiment, outgoing light irradiating the touch object 02 from the fingerprint recognition light source 15 may pass through the film layer in which the metal wires are disposed during its propagation process; at the same time, light reflected by the touch object 02 and received by the fingerprint recognition unit 141 may also pass through the film layer in which the metal wires are disposed during its propagation process. Therefore, the affection of the area obscured by the metal wires on the light transmittance is more obvious. The present disclosure provides vertical projections of at least one of the first type metal wires and the second type metal wires on the base substrate to be overlapped, the area of the display panel obscured by the metal wires may be decreased, so that the affection of the metal wires on the light transmittance of reflection light is reduced. That is, the light transmittance of both of the outgoing light and the reflection light is enabled to increase, the strength of the light received by the fingerprint recognition unit is increased, so that the strength of signals received by the fingerprint recognition unit is improved.

In one embodiment, the fingerprint recognition light source 15 may be a collimated light source.

In one embodiment, light emitted from the collimated light source may parallelly enter into a surface of the touch object, and interferences between various lights are relatively small. That is, light signals entering into the touch object are relatively strong, so that light signals reflected by the touch object are enhanced accordingly. Further, the strength of the light signals received by the fingerprint recognition unit is also enhanced accordingly and the accuracy of the fingerprint recognition is improved.

In one embodiment, the fingerprint recognition light source 15 may be an infrared light source.

In one embodiment, light emitted from the infrared light source and light emitted from the collimated light source have different wave bands, which enables infrared light signals emitted from the infrared light source and visible light emitted from the collimated light source to be not interfered with each other. That is, an image display function and a fingerprint recognition function of the display panel are interfered with each other, so that the image display quality of the display panel is improved and the accuracy of the fingerprint recognition is also improved.

In this embodiment, a pixel driving circuit unit includes a data writing transistor, a light-emitting control transistor and a reset transistor; at least two kinds of metal wires include a first scanning line, a second scanning line, a light-emitting control signal line and a first power signal line, the first scanning line is electrically connected to a gate electrode of the reset transistor, the second scanning line is electrically connected to a gate electrode of the data writing transistor, the light-emitting control signal line is electrically connected to a gate electrode of the light-emitting control transistor, and the first power signal line is electrically connected to a source electrode of the light-emitting control transistor; the first power signal line is a first type metal wire, at least one of the first scanning line, the second scanning line and the light-emitting control signal line is a second type metal wire.

Exemplarily, a description is given by taking 7T1C (seven transistors and one storage capacitor) pixel driving circuit as an example in this embodiment.

Figure 3:
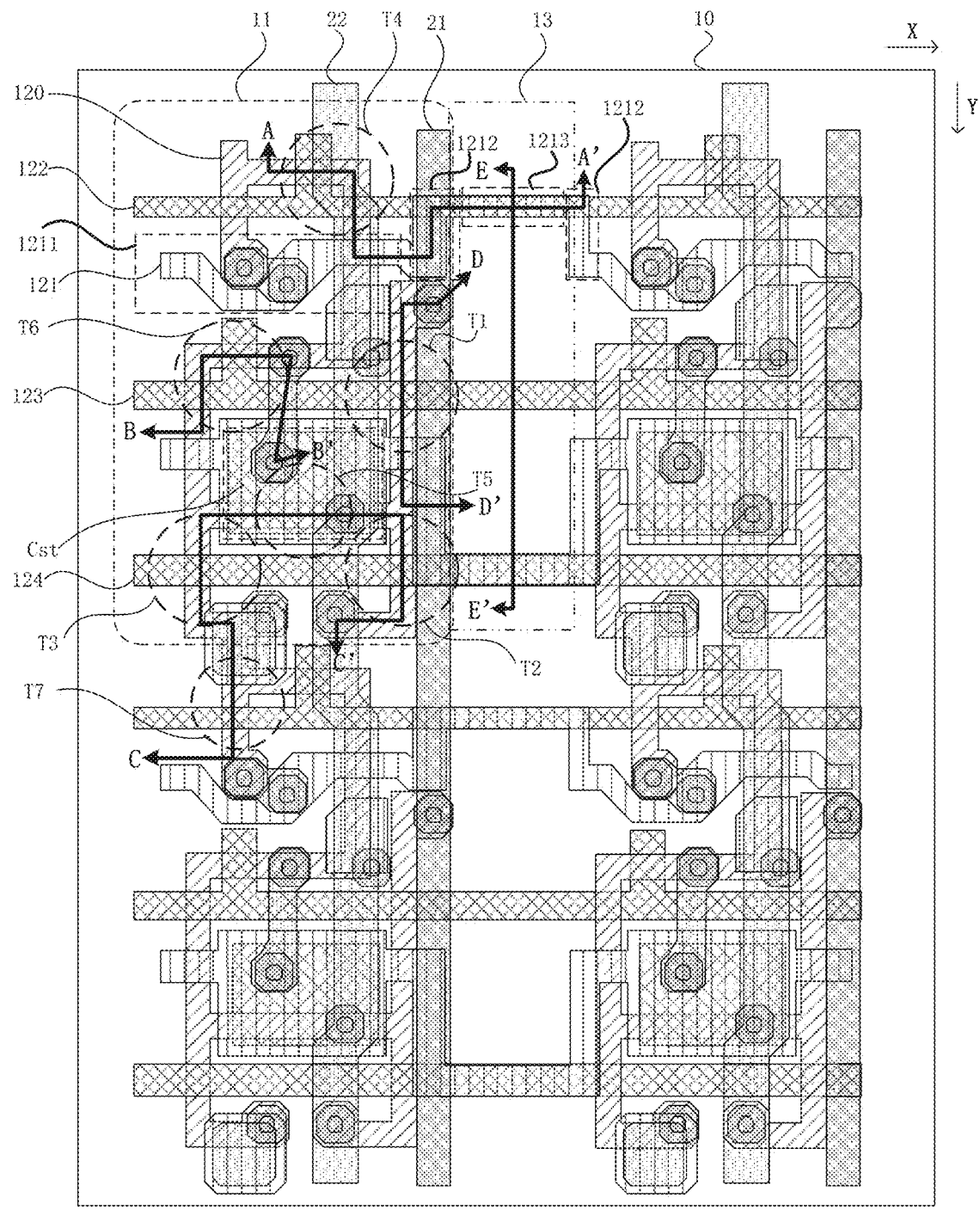
FIG. 3 is a structural diagram showing a layout of a pixel circuit driving unit according to an embodiment of the present disclosure.
Figure 4:
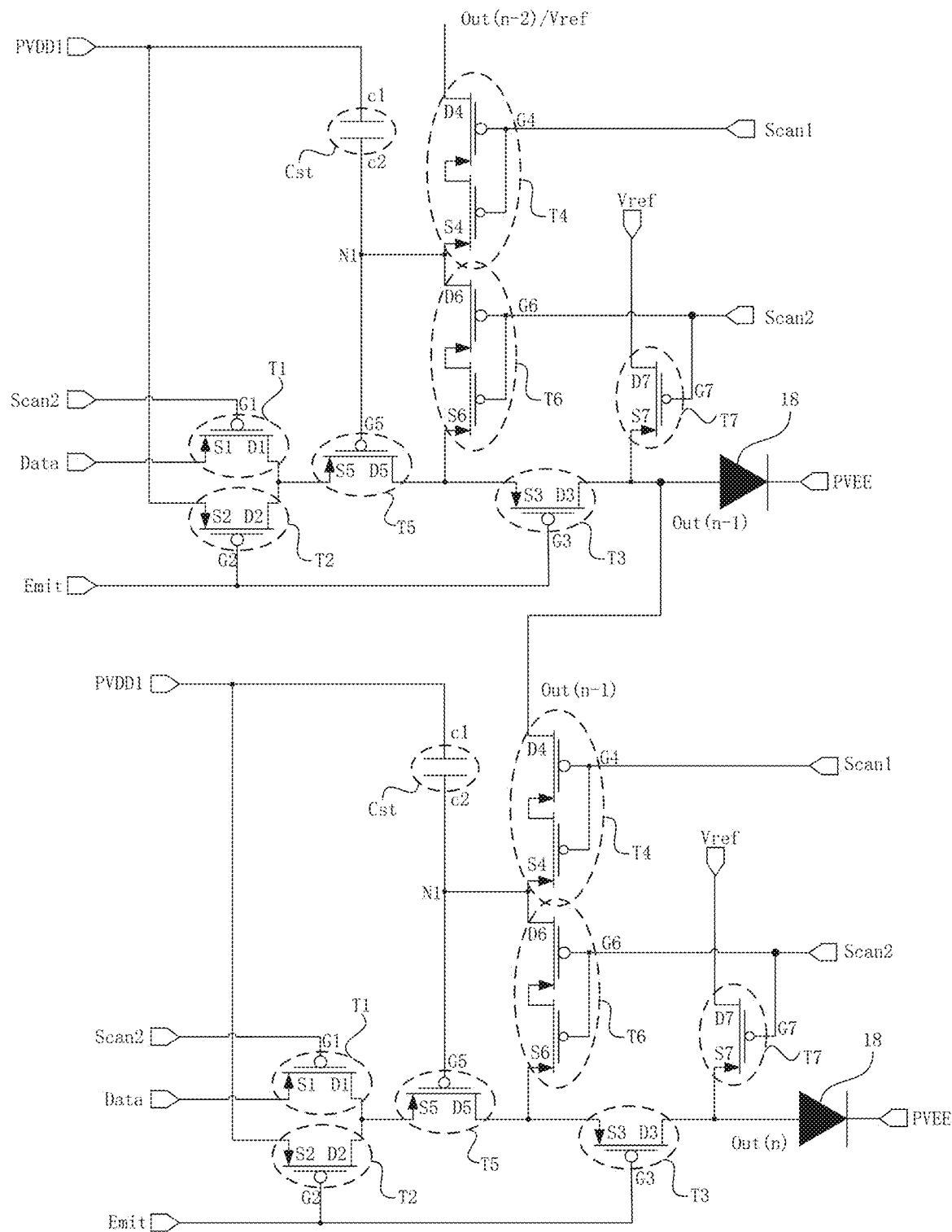
FIG. 4 is a diagram illustrating a circuit structure of the pixel circuit driving unit in FIG. 3.
Figure 6:
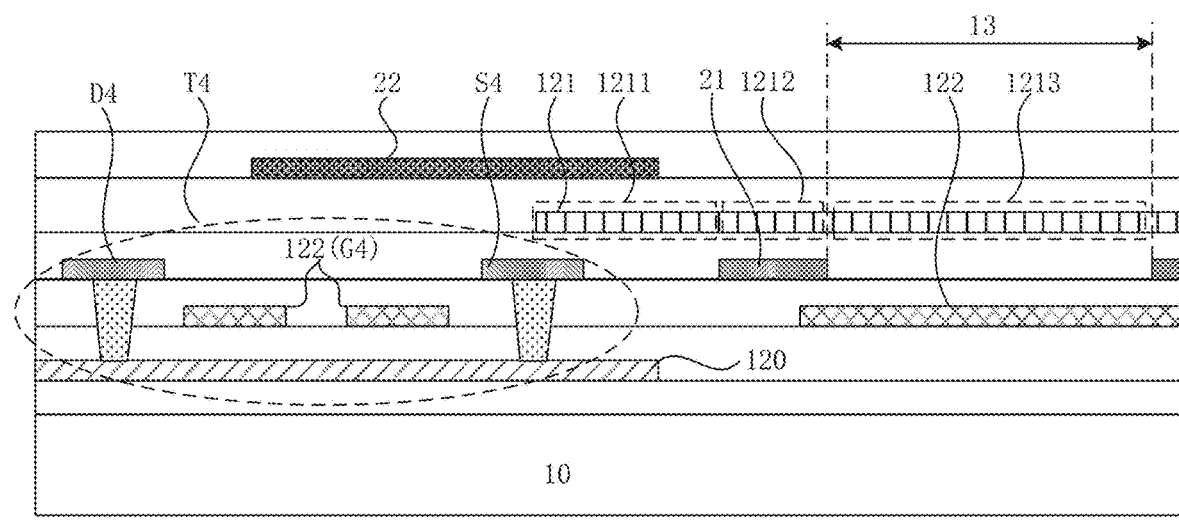
FIG. 6 is a sectional view of the structural diagram in FIG. 3 along a section line A-A'.
Figure 7:
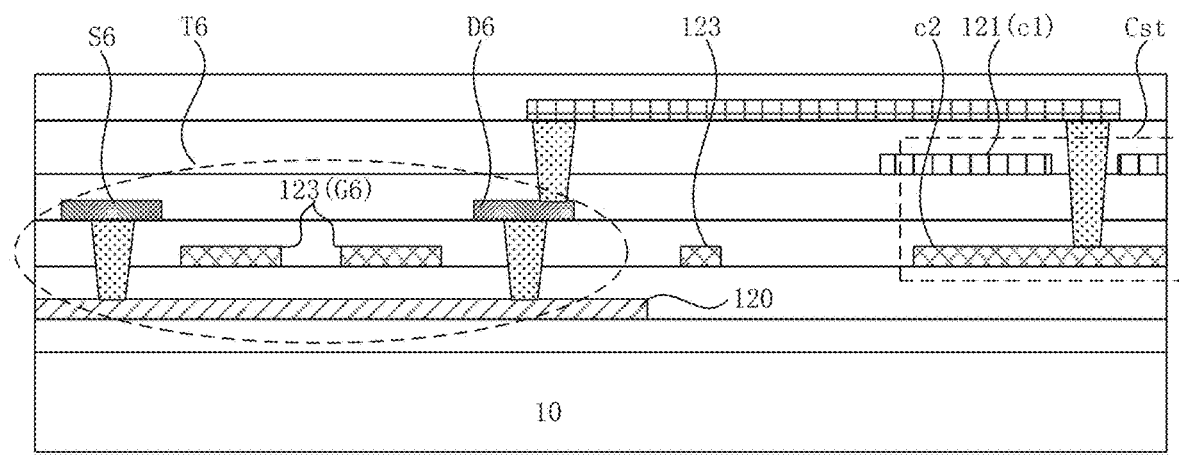
FIG. 7 is a sectional view of the structural diagram in FIG. 3 along a section line B-B'.
Figure 8:
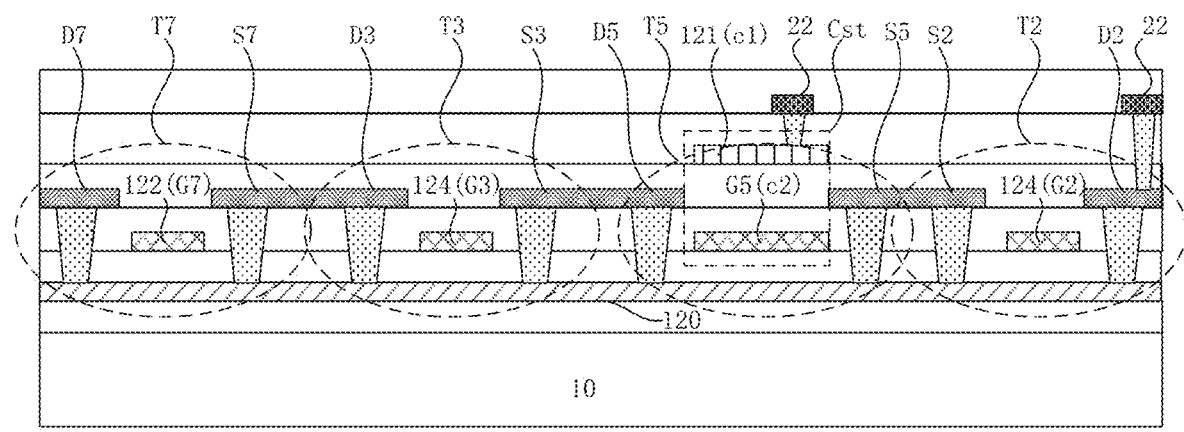
FIG. 8 is a sectional view of the structural diagram in FIG. 3 along a section line C-C'.
Figure 9:
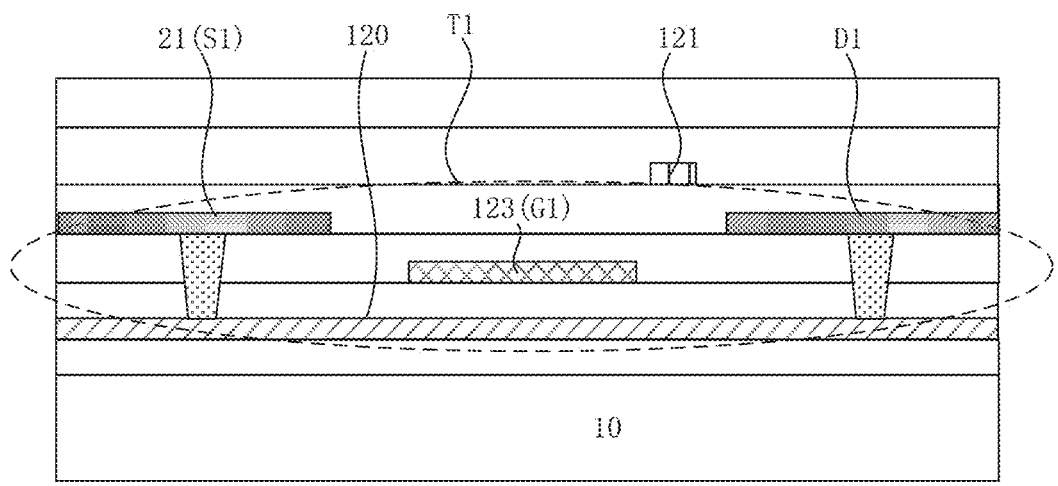
FIG. 9 is a sectional view of the structural diagram in FIG. 3 along a section line D-D'.

FIG. 3 is a structural diagram showing a layout of a pixel circuit driving unit according to an embodiment of the present disclosure; and FIG. 4 is a diagram illustrating a circuit structure of the pixel circuit driving unit in FIG. 3, where a circuit structure of the adjacent two rows of the pixel driving circuit units is shown in FIG. 4, where PVDD1 is a first power signal inputted to the first power signal line 121, Scan 1 is a first scanning signal inputted to the first scanning line 122, Scan 2 is a second scanning signal inputted to the second scanning line 123, Emit is a light-emitting control signal inputted to the light-emitting control signal line 124, Data is a data signal inputted to a data line 21, and PVEE is a second power signal provided a loop for the light-emitting unit 18. As shown in FIG. 3 and FIG. 4, a pixel driving circuit unit 11 includes a data writing transistor T1, a light-emitting control transistor T4 and a reset transistor T4, where the light-emitting control transistor includes a first light-emitting control transistor T2; at least two kinds of metal wires include a first scanning line 122, a second scanning line 123, a light-emitting control signal line 124 and a first power signal line 121, and a storage capacitor Cst, a driving transistor T5, a first additional transistor T6 and a second additional transistor T7. Specifically, referring to FIG. 3, FIG. 4 and FIG. 6, the first scanning line 122 is electrically connected to a gate electrode G4 of the reset transistor T4. In one embodiment, the first scanning line 122 and the gate electrode G4 of the reset transistor T4 are disposed in one layer, a drain electrode D4 of the reset transistor T4 is electrically connected to a source electrode S7 of the second additional transistor T7 (the drain electrode D4 of the reset transistor T4 in a first row is electrically connected to a reference voltage signal line Vref) of a prior stage (a prior row), and a source electrode S4 of the reset transistor T4 is electrically connected to a drain electrode D6 of the first additional transistor T6. Referring to FIG. 3, FIG. 4 and FIG. 7, the second scanning line 123 is electrically connected to a gate electrode G6 of the first additional transistor T6. In one embodiment, the second scanning line 123 and the gate electrode G6 of the first additional transistor T6 are disposed in one layer, a drain electrode D6 of the first additional transistor T6 is electrically connected to a second electrode c2 of the storage capacitor Cst via a span bridge, and the span bridge is insulated with the first electrode c1 of the storage capacitor Cst. Referring to FIG. 3, FIG. 4 and FIG. 8, a source electrode S7 of the second additional transistor T7 is electrically connected to a drain electrode D3 of a second light-emitting control transistor T3, at the same time, as an output terminal of the pixel driving circuit unit, the source electrode S7 of the second additional transistor T7 is electrically connected to the light-emitting unit 18; the light-emitting control signal line 124 is electrically connected to a gate electrode G2 of a first light-emitting control transistor T2 and a gate electrode G3 of a second light-emitting control transistor T3, a drain electrode D5 of a driving transistor T5 is electrically connected to a source electrode S3 of the second light-emitting control transistor T3, a source electrode S5 of a driving transistor T5 is electrically connected to a source electrode S2 of the first light-emitting control transistor T2, a gate electrode G5 of the driving transistor T5 is electrically connected to the second electrode c2 of the storage capacitor Cst, in one embodiment, the gate electrode G5 of the driving transistor T5 is reused as the second electrode c2 of the storage capacitor Cst; the first power signal line 121 and the first electrode c1 of the storage capacitor Cst are disposed in one layer. Referring to FIG. 3, FIG. 4 and FIG. 9, the second scanning line 123 is electrically connected to a gate electrode G1 of the data writing transistor T1, a source electrode S1 of the data writing transistor T1 is electrically connected to the data line 21, the drain electrode D1 of the data writing transistor T1 is electrically connected to a drain electrode D2 of the first light-emitting control transistor T2 and a source electrode S5 of the driving transistor T5. In addition, a source electrode S6 of the first additional transistor T6 is electrically connected to a drain electrode D5 of the driving transistor T5. Where the reset transistor T4 and the first additional transistor T6 may be a dual-gate transistor. In this embodiment, for transistors T1-T7 as circled in FIG. 3, a gate electrode G7 of the second additional transistor T7 is electrically connected to a first scanning line 122 in a next row, the first scanning line 122 in the next row is electrically connected to the second scanning line 123 in a current row. Therefore, for the current row, the gate electrode G7 of the second additional transistor T7 is electrically connected to the second scanning line 123 in the current row.

Figure 5:
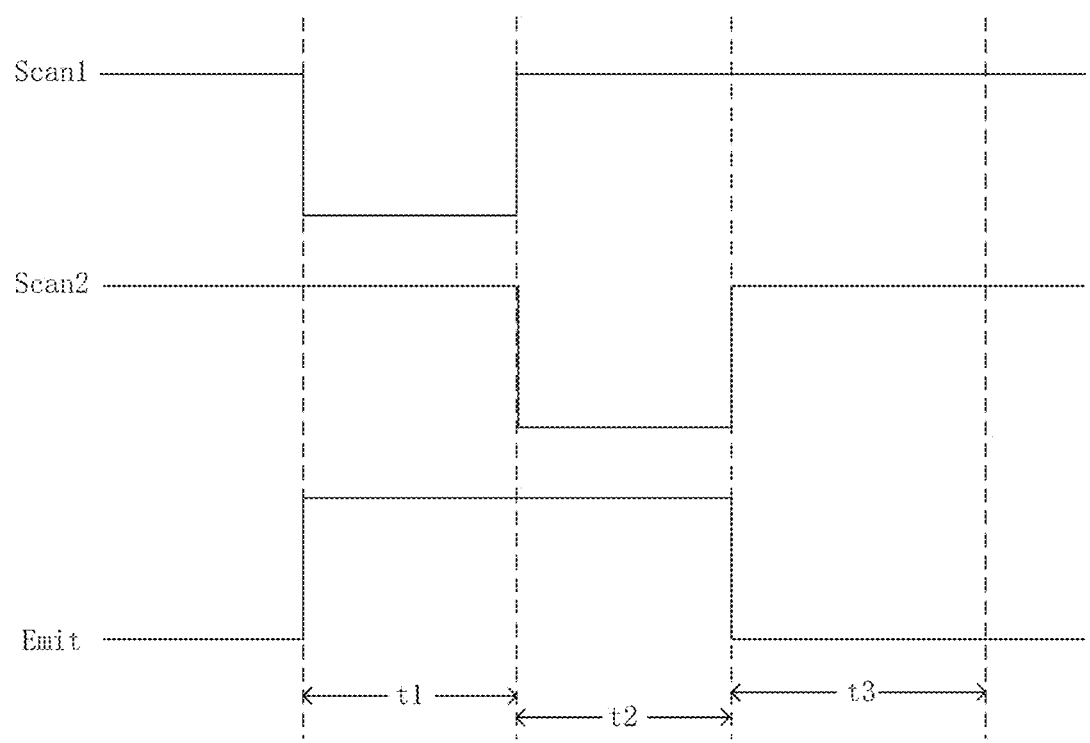
FIG. 5 is a driving timing graph of a pixel circuit driving unit according to an embodiment of the present disclosure.

FIG. 5 is a driving timing graph of a pixel circuit driving unit according to an embodiment of the present disclosure. Each of the transistors T1-T7 described above may be a P-type transistor or a N-type transistor, and no limitations are made for it in the present disclosure. Exemplarily, a detailed description on working principles of the pixel driving circuit unit is given by taking a case that the transistors T1-T7 are P-type transistors and reference voltage signal is a signal at logic low-level as an example:

In a time period t1 (an initial stage), the first scanning line 122 is in a logic low-level state, the second scanning line 123 and the light-emitting control signal line 24 are in a logic high-level state. At the moment, the reset transistor T4 is turned on, a potential of a reference voltage signal line Vref is applied to the second electrode c2 of the storage capacitor via the reset transistor T4. That is, a potential of a node N1 is the reference voltage signal. Here, a potential of the gate electrode G5 of the driving transistor T5 is also the reference voltage signal.

In a time period t2 (a data signal voltage writing stage), the second scanning line 123 is in a logic low-level state, the first scanning line 122 and the light-emitting control signal line 124 are in a logic high-level state. At the moment, the data writing transistor T1 and the first additional transistor T6 are turned on. At the same time, the potential of the gate electrode G5 of the driving transistor T5 is the reference voltage signal, which is also a low potential, the driving transistor T5 is also turned on. A data signal in the data line 21 is applied to the node N1 via the data writing transistor T1, the driving transistor T5 and the first additional transistor T6, and the potential of the node N1 is gradually pulled up by the potential of the data line 21. When a gate voltage of the driving transistor T5 is pulled up to a voltage that a voltage difference between its source voltage and said voltage is not larger than a threshold voltage $V_{th}$, the driving transistor T5 will be in a cut-off state. Since the source electrode S5 of the driving transistor T5 is electrically connected to the data line 21 via the data signal writing transistor T1, a potential V21 of its source electrode S5 maintains unchanged. Thus, when the driving transistor T5 is cut off, the potential of the gate electrode G5 of the driving transistor T5 is $V_{data}-|V_{th}|$, and $V_{data}$ is a value of the voltage in the data line and $|V_{th}|$ is a threshold voltage of the driving transistor T5.

Here, a voltage difference Vc between the first electrode c1 and the second electrode c2 of the storage capacitor Cst is:

$$Vc = V1 - V2 = V_{PVDD} - (V_{data} - |V_{th}|)$$

where V1 represents the potential of the first electrode c1, V2 represents the potential of the second electrode c2, and $V_{PVDD}$ is a voltage value of the power signal in the first power signal line 121.

In the data signal voltage writing stage, the voltage difference Vc between the first electrode c1 and the second electrode c2 of the storage capacitor Cst includes the threshold voltage $|V_{th}|$ of the driving transistor T5. That is, at the data signal voltage writing stage, the threshold voltage $V_{th}$ of the driving transistor T5 is detected and stored in the storage capacitor Cst.

The potential of the reference voltage signal line Vref is applied to a first electrode of a light-emitting component via the second additional transistor T7, a potential of the first electrode of the light-emitting component is initialized so as to decrease the affection of a voltage of the light-emitting component in a previous frame on a voltage of the light-emitting component in a next frame. Therefore, the homogeneity of display is further improved.

In a time period t3 (a light-emitting stage), the light-emitting control signal line 124 is in a logic low-level state, the first scanning line 122 and the second scanning line 123 are in a logic high-level state. At the moment, the first light-emitting control transistor T2 and the second light-emitting control transistor T3 are turned on, the voltage of the source electrode S5 of the driving transistor T5 is $V_{PVDD}$, and a voltage difference between the source electrode and the gate electrode of the driving transistor T5 is:

$$V_{sg} = V_{PVDD} - (V_{data} - |V_{th}|).$$

The light-emitting unit 18 is driven by a drain current of the driving transistor T5 to emit light, and the current of the driving transistor $I_d$ satisfies the following formula:

$$I_d = \frac{1}{2}\mu C_{ox}\frac{W}{L}(V_{sg} - |V_{th}|)^2 =$$
$$\frac{1}{2}\mu C_{ox}\frac{W}{L}(V_{PVDD} - V_{data} + |V_{th}| - |V_{th}|)^2 = \frac{1}{2}\mu C_{ox}\frac{W}{L}(V_{PVDD} - V_{data})^2,$$

where μ is a mobility of carriers of the driving transistor T5, W and L are respectively a length and a width of a channel of the first light-emitting control T2 and the second light-emitting control T3, $C_{on}$ is a capacitance of a gate oxide of the driving transistor T5 in an unit area, and is a voltage value in the first power signal line 121, and $V_{data}$ is a voltage value in the data line.

It should be noted that, the present disclosure includes, but is not limited to, a design of the metal wires in a transverse direction (first direction) for the 7T1C pixel driving circuit, and technical solutions in the present disclosure can still be adopted for a design of the metal wires in the transverse direction for other pixel driving circuits so as to improve the light transmittance of the display panel.

In one embodiment, still referring to FIG. 3 and FIG. 8, the display panel further includes a second power signal line 22 extending along a second direction Y. The first power signal line 121 and the second power signal line 22 are disposed in different layers, and the first power signal line 121 is electrically connected to the second power signal line 22 via a via hole. Therefore, the first power signal line 121 and the second power signal line 22 are intersected to form a mess structure, the resistance of the whole power signal line is reduced so as to reduce the affection of a voltage drop, power signals in the whole display panel are enabled to be evenly distributed and a power voltage of each of the pixel circuit driving unit has a similar value. Therefore, an uneven display problem of the display panel has been improved, that is, the display effect of the display panel is improved. In addition, the drain electrode D2 of the first light-emitting control T2 is electrically connected to the second power signal line 22.

Figure 10:
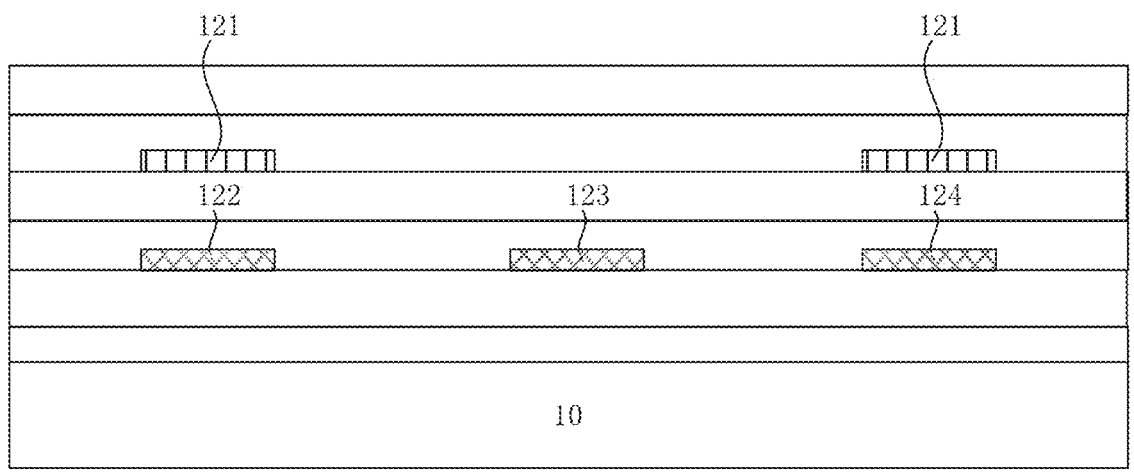
FIG. 10 is a sectional view of the structural diagram in FIG. 3 along a section line E-E'.

In one embodiment, referring to FIG. 10, vertical projections of the first power signal line 121 on the base substrate 10 is overlapped with that of the first scanning line 122 and the light-emitting control line 124 on the base substrate in the first gap region. As the overlap of the first power signal line 121 and the first scanning line 122 may increase a load capacitance of the first scanning line 122, which may affect a signal transmission. Therefore, vertical projections of the first power signal line 121 on the base substrate 10 is overlapped with that of the second scanning line 123 and/or the light-emitting control line 124 on the base substrate in the first gap region. However, vertical projections of the first power signal line 121 and the first scanning line 122 on the base substrate 10 are not overlapped.

In one embodiment, the display panel further includes a third type metal wire defining an edge region of the pixel driving circuit unit in the second direction Y; the third type metal wire and the first type metal wire are disposed on different layers. The first type metal wire includes a first wire segment, a second wire segment and a third wire segment, and the first wire segment is disposed in the area corresponding to the pixel driving circuit unit and extends along a first direction X, a vertical projection of the second wire segment on the base substrate is located inside a vertical projection of the third type metal wire, the third wire segment is disposed in the first gap region, and vertical projections of the third wire segment and a portion of the second type metal wire disposed in the first gap region on the base substrate are overlapped.

In one embodiment, an area in which vertical projections of the second type metal wire and the third type metal wire on the base substrate disposed is utilized to distribute the first wire segment and the second wire segment of the first type metal wire. Therefore, on one hand, the second wire segment may be disposed at an edge of the pixel driving circuit unit, so that the mutual interferences of electrical signals between the second wire segment and the pixel driving circuit unit are relatively small; on the other hand, a relatively large first gap region is ensured, so that a relatively large light transmittance area of the display panel is ensured, that is, a relatively good light transmittance performance may be ensured so as to improve the strength of signals received by the fingerprint recognition unit.

Exemplarily, the third type metal wire may be the data line above mentioned. Still referring to FIG. 3 and FIG. 6, the first power signal line 121 includes a first wire segment 1211, a second wire segment 1212 and a third wire segment 1213, the first wire segment 1211 is disposed in an area corresponding to the pixel driving circuit unit 11 and extends along the first direction X, a vertical projection of the second wire segment 1212 on the base substrate 10 is located inside a vertical projection of the data line 21 on the base substrate 10, the third wire segment 1213 is disposed in the first gap region 13, and vertical projections of the third wire segment 1213 and a portion of the second type metal wire (e.g. a scanning line 122) disposed in the first gap region on the base substrate 10 are overlapped.

Figure 11:
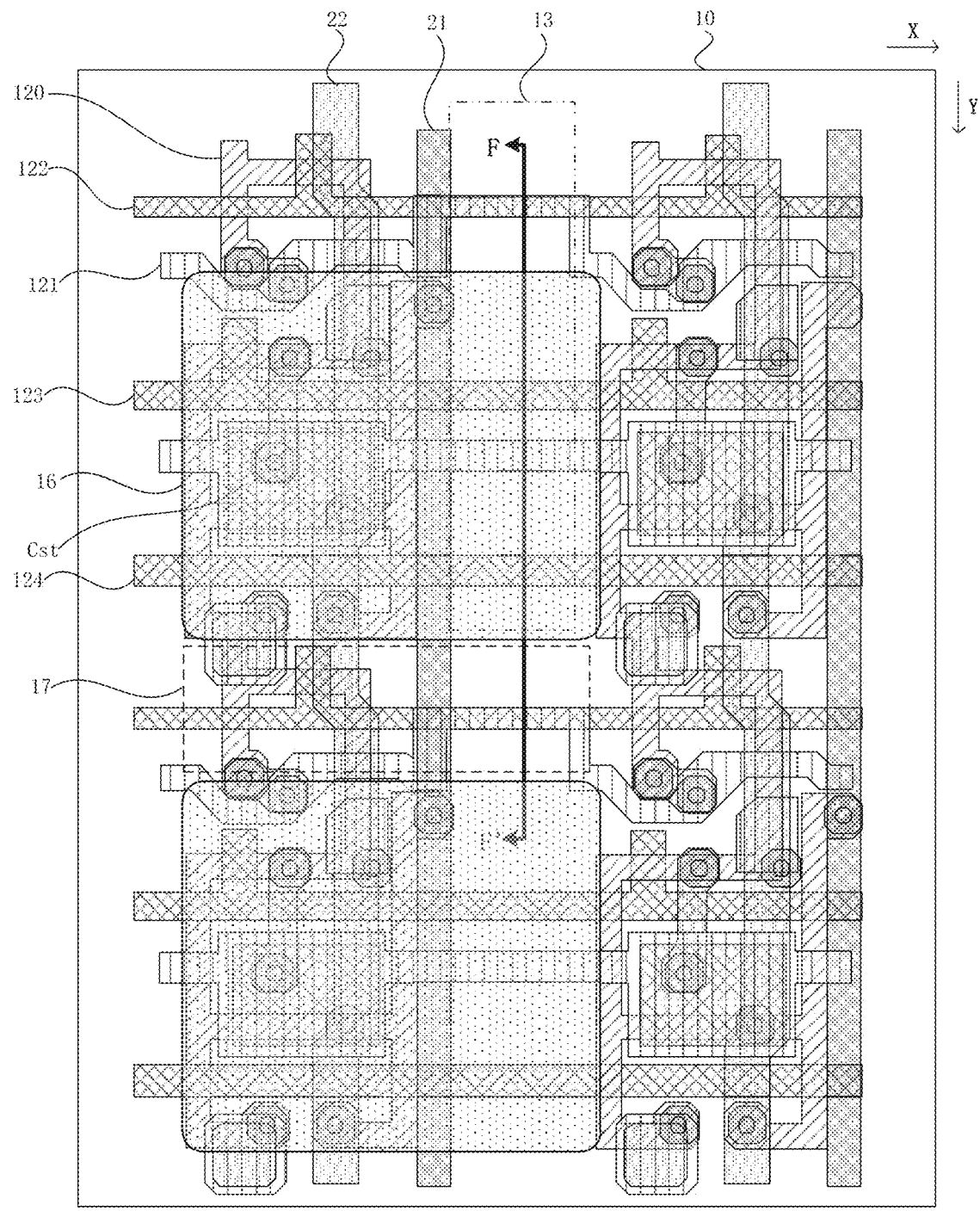
FIG. 11 is a structural diagram showing a layout of another display panel according to an embodiment of the present disclosure.
Figure 12:
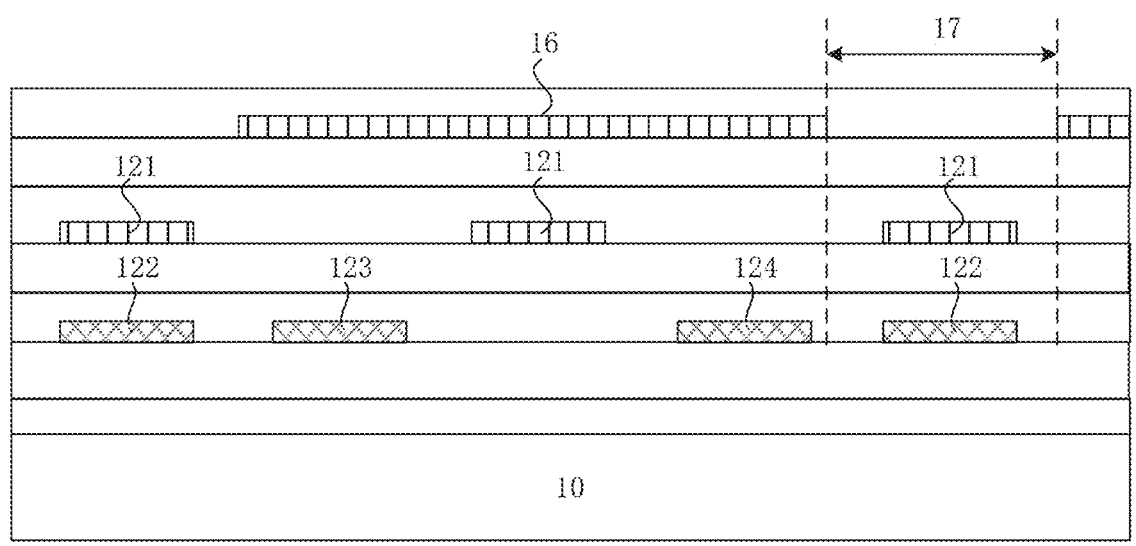
FIG. 12 is a sectional view of the structural diagram in FIG. 11 along a section line F-F'.

FIG. 11 is a structural diagram showing a layout of another display panel according to an embodiment of the present disclosure. Referring to FIG. 11 and FIG. 12, the display panel further includes a plurality of reflective electrodes 16 (commonly, an anode of the light-emitting unit), and at least two kinds of metal wires (including a first power signal line 121, a first scanning line 122, the second scanning line 123 and the light-emitting control line 124) disposed on one side of a reflective electrode 16 closing to the base substrate 10. For a display panel without a function of fingerprint recognition, metal wires disposed on one side of a reflective electrode closing to the base substrate may not obscure light emitted from the light-emitting unit, the metal wires disposed on one side of a reflective electrode facing away from the base substrate are commonly disposed in a region between corresponding light-emitting units, which may also not obscure light emitted from the light-emitting unit; however, the present disclosure is directed to an external type fingerprint recognition assembly, considering that a common wiring for the metal wires disposed on one side of the reflective electrode closing to the base substrate may decrease the light transmittance of the display panel. Therefore, a wiring is performed for the metal wires disposed on one side of the reflective electrode closing to the base substrate under the circumstance that the display effect is not affected.

In one embodiment, each reflective electrode 16 covers at least one transistor, since light emitted from the light-emitting unit may be reflected by the reflective electrode 16, irradiation of the light emitted from the light-emitting unit to the transistor is avoided by the reflective electrode 16. Therefore, the affection of the irradiation on the performance of the transistor is avoided so as to ensure display effects of the display panel.

In one embodiment, the reflective electrode 16 may be a metal electrode layer. By utilizing a well homogeneity of heat conduction of the metal electrode layer, heat around the transistor are rapidly conducted, and the affection of temperature on the performance of the transistor is avoided, so that display effects of the display panel are ensured.

Still referring to FIG. 11 and FIG. 12, a plurality of reflective electrodes 16 are arranged in a matrix along a first direction X and a second direction Y, a second gap region 17 is formed between adjacent two reflective electrodes 16 in the second direction Y; in the second direction Y, adjacent two reflective electrodes 16 exist and stretch over the first gap region 13. In the first gap region 13, vertical projections of the first type metal wires and the second metal wires 122 traversing the second gap region 17 between the adjacent two reflective electrodes 16 on base substrate 10 are overlapped. Considering that the reflective electrode 16 is a major factor affecting the light transmittance, in one embodiment, portions of the first type metal wires and the second metal wires 122 covered by the adjacent two reflective electrodes 16 has no overlapped area, so that the interferences between the first type metal wires and the second metal wires 122 are decreased without affecting the light transmittance.

In one embodiment, referring to FIG. 12, the first scanning line 122, the second scanning line 123 and the light-emitting control signal line 124 are disposed in one layer and distributed in a cyclic manner.

In one embodiment, the first scanning line 122, the second scanning line 123 and the light-emitting control signal line 124 may be formed in one process through a mask evaporation method or an etching-after-evaporation method, so that the manufacturing process of the display panel is simplified and the manufacturing difficulty is decreased.

Figure 13:
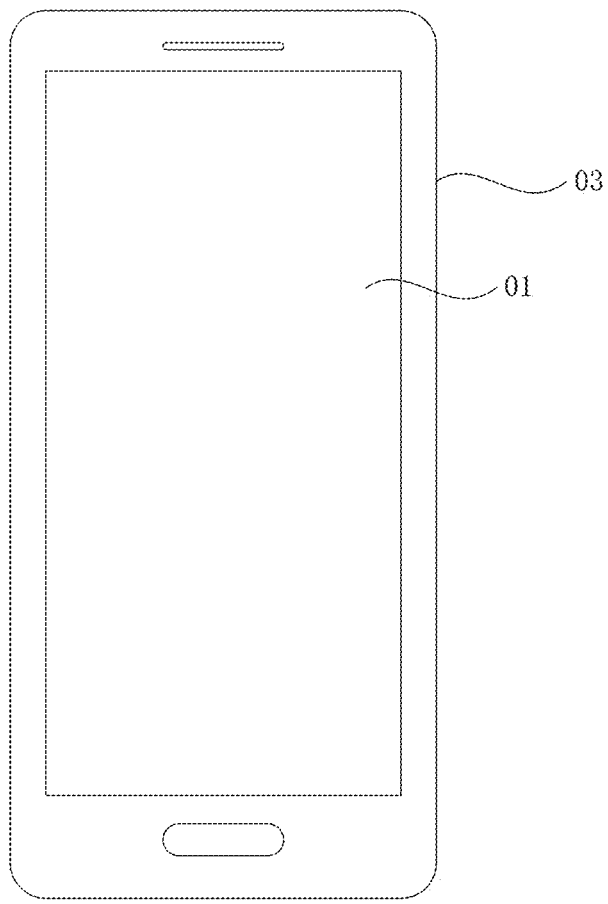
FIG. 13 is a structural diagram showing a display device according to an embodiment of the present disclosure.

The present disclosure further provides an organic light-emitting display device. FIG. 13 is a structural diagram showing an organic light-emitting display device according to an embodiment of the present disclosure. As shown in FIG. 13, a display device 03 includes the display panel 01 in the above embodiments.

Exemplarily, the display device 03 may include a display apparatus, e.g. a mobile phone, a computer and a smart wearable device, and no limitations are made thereto.

The display device provided by the present disclosure provides vertical projections of at least one of the first type metal wires and the second type metal wires on the base substrate to be overlapped. In contrast with a related art that vertical projections of each of the first type metal wires and the second type metal wires on the base substrate are not overlapped, in the present application, the area involved at least one of the first type metal wires is converted from a non-transparent region into a transparent region. That is, the affection of the first type metal wires on the light transmittance of the display panel is reduced, so that the light transmittance of the display panel is improved. Therefore, the strength of the light received by the fingerprint recognition unit is improved, thereby improving the strength of the signals received by the fingerprint recognition unit.

What is claimed is:

1. A display panel, comprising:
   a display assembly, wherein the display assembly comprises a base substrate, a plurality of pixel driving circuit units disposed on one side of the base substrate and at least two kinds of metal wires extending along a first direction, wherein the plurality of pixel driving circuit units are arranged in a matrix along the first direction and a second direction, and a first gap region is formed between adjacent two of the plurality of pixel driving circuit units in the first direction;
   a fingerprint recognition assembly disposed on one side of the base substrate facing away from the plurality of pixel driving circuit units, wherein the fingerprint recognition assembly comprises at least one fingerprint recognition unit, wherein the at least one fingerprint recognition unit is configured to perform a fingerprint recognition based on light reflected from a touch object to the fingerprint recognition unit; and
   wherein the at least two kinds of metal wires comprise a plurality of first type metal wires and a plurality of second type metal wires, wherein the plurality of first type metal wires and the plurality of second type metal wires are disposed in different layers, a vertical projection of at least one of the plurality of first type metal wires on the base substrate is overlapped with vertical projections of the plurality of second type metal wires on the base substrate in the first gap region.

2. The display panel according to claim 1, wherein the display panel further comprises a plurality of reflective electrodes, and the at least two kinds of metal wires are disposed on one side of the plurality of reflective electrodes closing to the base substrate.

3. The display panel according to claim 1, wherein vertical projections of the plurality of first type metal wires on the base substrate are overlapped with that of the plurality of second type metal wires on the base substrate in the first gap region.

4. The display panel according to claim 2, wherein the plurality of reflective electrodes are arranged in a matrix along the first direction and the second direction, a second gap region is formed between adjacent two of the plurality of reflective electrodes in the second direction; and wherein in the second direction, the adjacent two of the plurality of reflective electrodes stretch over the first gap region, the vertical projections of the plurality of first type metal wires and the plurality of second type metal wires crossing the second gap region between the adjacent two of the plurality of reflective electrodes on the base substrate are overlapped.

5. The display panel according to claim 1, wherein the display panel further comprises a plurality of third type metal wires defining an edge region of the plurality of pixel driving circuit units in the second direction;
wherein the plurality of third type metal wires and the plurality of first type metal wires are disposed on different layers; and
wherein the plurality of first type metal wires each comprise a first wire segment, a second wire segment and a third wire segment, wherein the first wire segment is disposed in the area corresponding to one of the plurality of pixel driving circuit units and extends along the first direction, a vertical projection of the second wire segment on the base substrate is located inside a vertical projection of respective one of the plurality of third type metal wires, the third wire segment is disposed in the first gap region, and a vertical projection of the third wire segment on the base substrate is overlapped with a vertical projection of a portion of respective one of the plurality of second type metal wires on the base substrate, wherein the portion of respective one of the plurality of second type metal wires is located in the first gap.

6. The display panel according to claim 1, wherein the plurality of pixel driving circuit units each comprise a data writing transistor, a light-emitting control transistor and a reset transistor;
wherein the at least two kinds of metal wires comprise a first scanning line, a second scanning line, a light-emitting control signal line and a first power signal line, wherein the first scanning line is electrically connected to a gate electrode of the reset transistor, the second scanning line is electrically connected to a gate electrode of the data writing transistor, the light-emitting control signal line is electrically connected to a gate electrode of the light-emitting control transistor, and the first power signal line is electrically connected to a source electrode of the light-emitting control transistor; and
wherein the first power signal line belongs to the plurality of first type metal wires, at least one of the first scanning line, the second scanning line and the light-emitting control signal line belongs to the plurality of second type metal wires.

7. The display panel according to claim 6, wherein the first scanning line, the second scanning line and the light-emitting control signal line are disposed in one layer with a cyclic manner.

8. The display panel according to claim 6, wherein vertical projections of the first power signal line, the second scanning line and the light-emitting control signal line on the base substrate are overlapped in the first gap region.

9. The display panel according to claim 6, wherein vertical projections of the first power signal line, the second scanning line on the base substrate are overlapped in the first gap region.

10. The display panel according to claim 6, wherein vertical projections of the first power signal line, the light-emitting control signal line on the base substrate are overlapped in the first gap region.

11. The display panel according to claim 6, wherein the display panel further comprises a second power signal line extending along the second direction, wherein the first power signal line and the second power signal line are disposed in different layers, and the first power signal line is electrically connected to the second power signal line via a via hole.

12. The display panel according to claim 6, wherein the plurality of pixel driving circuit units each further comprise a storage capacitor, wherein a first electrode plate of the storage capacitor is disposed in a same layer with the first power signal line and is electrically connected to the first power signal line.

13. The display panel according to claim 1, wherein the plurality of pixel driving circuit units each are configured to provide a light source for the fingerprint recognition assembly, the fingerprint recognition unit is configured to perform a fingerprint recognition based on light emitted from respective one of the plurality of pixel driving circuit units and reflected to the respective fingerprint recognition unit via the touch object.

14. The display panel according to claim 1, wherein the display panel further comprises a fingerprint recognition light source, wherein the fingerprint recognition light source is disposed at one side of the fingerprint recognition assembly facing away from the base substrate;
wherein light emitted from the fingerprint recognition light source irradiates the touch object via a gap between adjacent two fingerprint recognition units, and the fingerprint recognition unit is configured to perform a fingerprint recognition based on light emitted from the fingerprint recognition light source and reflected to the fingerprint recognition unit via the touch object.

15. The display panel according to claim 12, wherein the fingerprint recognition light source is a collimated light source.

16. A display device, comprising a display panel, wherein the display panel comprises:
a display assembly, wherein the display assembly comprises a base substrate, a plurality of pixel driving circuit units disposed on one side of the base substrate and at least two kinds of metal wires extending along a first direction, wherein the plurality of pixel driving circuit units are arranged in a matrix along the first direction and a second direction, and a first gap region is formed between adjacent two of the plurality of pixel driving circuit units in the first direction;
a fingerprint recognition assembly disposed on one side of the base substrate facing away from the plurality of pixel driving circuit units, wherein the fingerprint recognition assembly comprises at least one fingerprint recognition unit, wherein the at least one fingerprint recognition unit is configured to perform a fingerprint recognition based on light reflected from a touch object to the fingerprint recognition unit; and
wherein the at least two kinds of metal wires comprise a plurality of first type metal wires and a plurality of second type metal wires, wherein the plurality of first type metal wires and the plurality of second type metal wires are disposed in different layers, a vertical projection of at least one of the plurality of first type metal wires on the base substrate is overlapped with vertical projections of the plurality of second type metal wires on the base substrate in the first gap region.

* * * * *